United States Patent

Konstant

[11] Patent Number: 5,567,103
[45] Date of Patent: Oct. 22, 1996

[54] UNLOADING DEVICE

[76] Inventor: Anthony N. Konstant, 920 Fisher Ln., Winnetka, Ill. 60092

[21] Appl. No.: 335,301

[22] Filed: Oct. 21, 1994

[51] Int. Cl.⁶ .................................................. B65G 1/18
[52] U.S. Cl. ...................... 414/276; 414/286; 211/162; 211/151; 193/40; 193/39
[58] Field of Search .................................. 414/276, 286, 414/266, 267; 211/151, 162, 134; 193/38, 39, 40, 41, 35 A, 36; 104/134

[56] References Cited

U.S. PATENT DOCUMENTS

| | | | |
|---|---|---|---|
| 3,399,784 | 9/1968 | Buchbinder et al. | 211/162 XV |
| 3,805,974 | 4/1974 | Andersson et al. | 414/276 |
| 4,197,047 | 4/1980 | Haldimann | 414/276 |
| 4,485,910 | 12/1984 | Tabler | 414/286 XV |
| 5,115,920 | 5/1992 | Tipton et al. | 211/151 XV |
| 5,193,696 | 3/1993 | Price, Jr. et al. | 211/162 |
| 5,312,004 | 5/1994 | Krummell et al. | 414/276 XV |

FOREIGN PATENT DOCUMENTS

| | | | |
|---|---|---|---|
| 1221979 | 7/1966 | Germany | 414/276 |
| 55179 | 5/1977 | Japan | 414/276 |

*Primary Examiner*—Frank E. Werner

[57] ABSTRACT

A container unloading device which includes a two-tiered rail system that has been adapted to include an upper set of feed rails that cycle carts carrying containers from the back of the system to the front of the system for unloading. At the system's front end, the feed rails have sections of increased angularity which support the cart and container at an angle which increases accessibility to the container's contents. The system also includes a set of transfer ramps which allow the cart to move from rolling engagement with the feed rails to rolling engagement with the lower set of return rails where the cart and unloaded container then move to the back of the system into a position for reloading. The device may further include a speed reducer which retards the cart's acceleration down the sections of increased angularity.

7 Claims, 5 Drawing Sheets

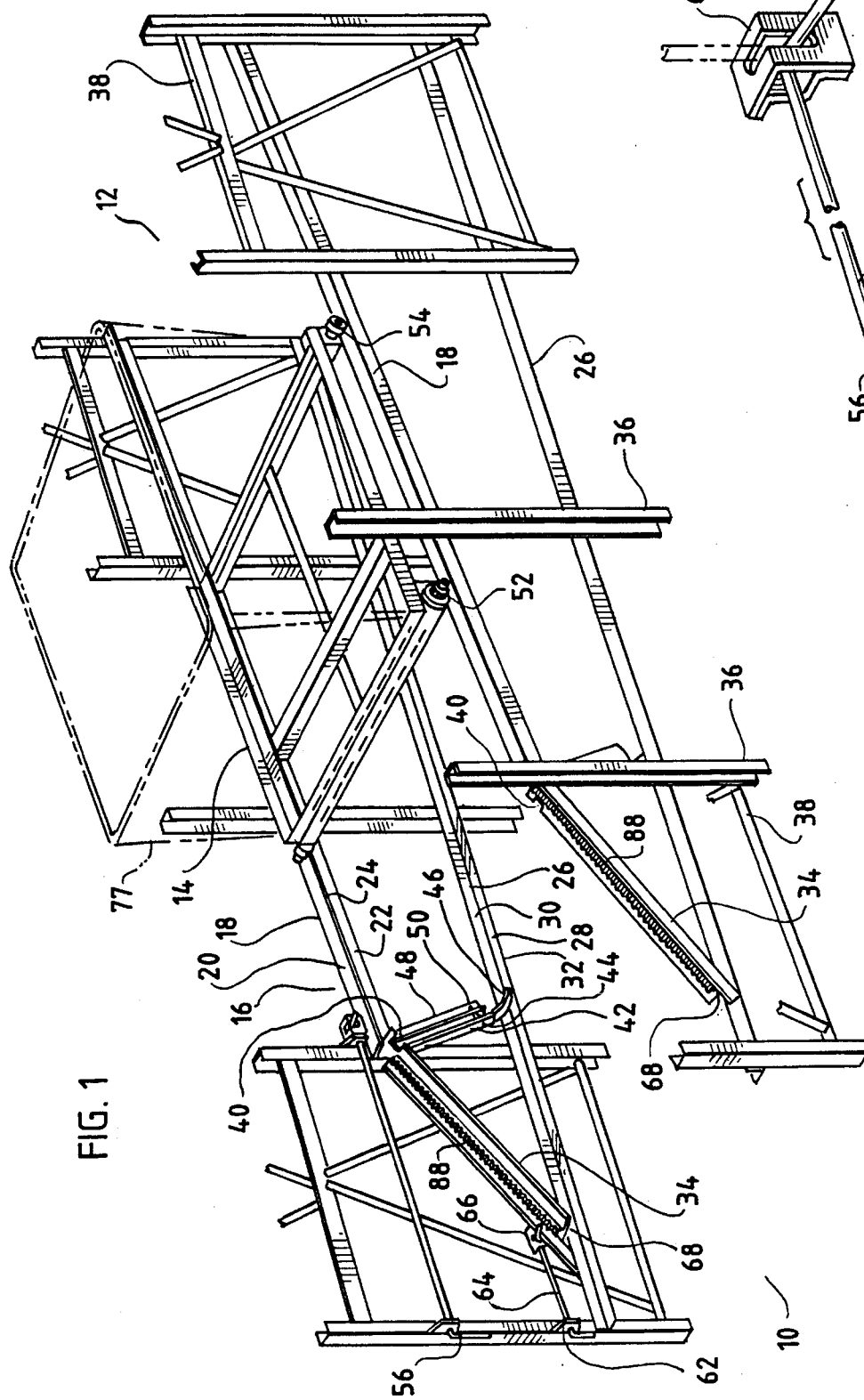
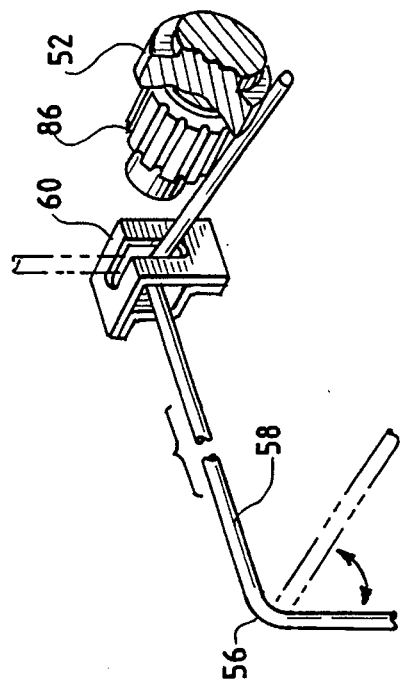
FIG. 1
FIG. 2

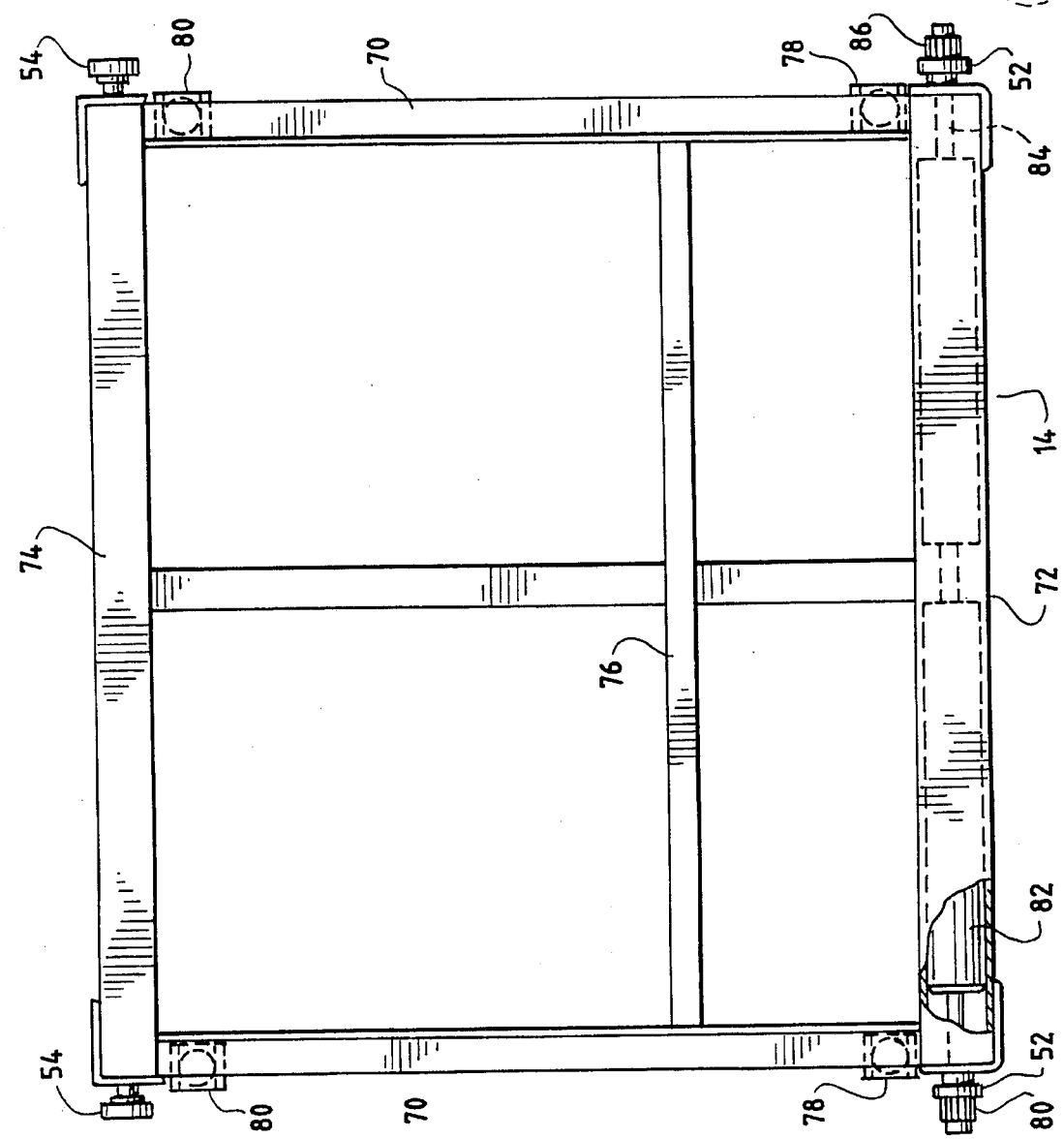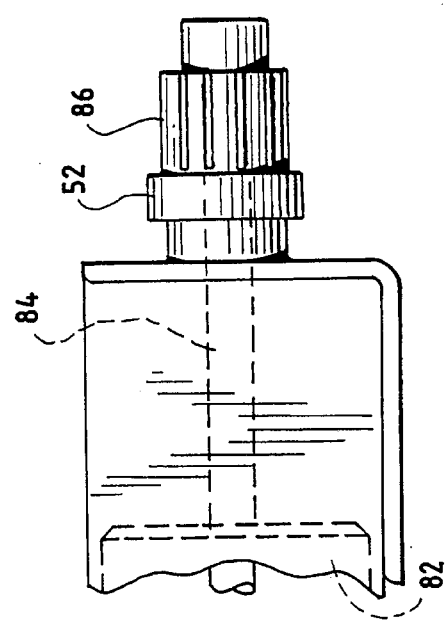

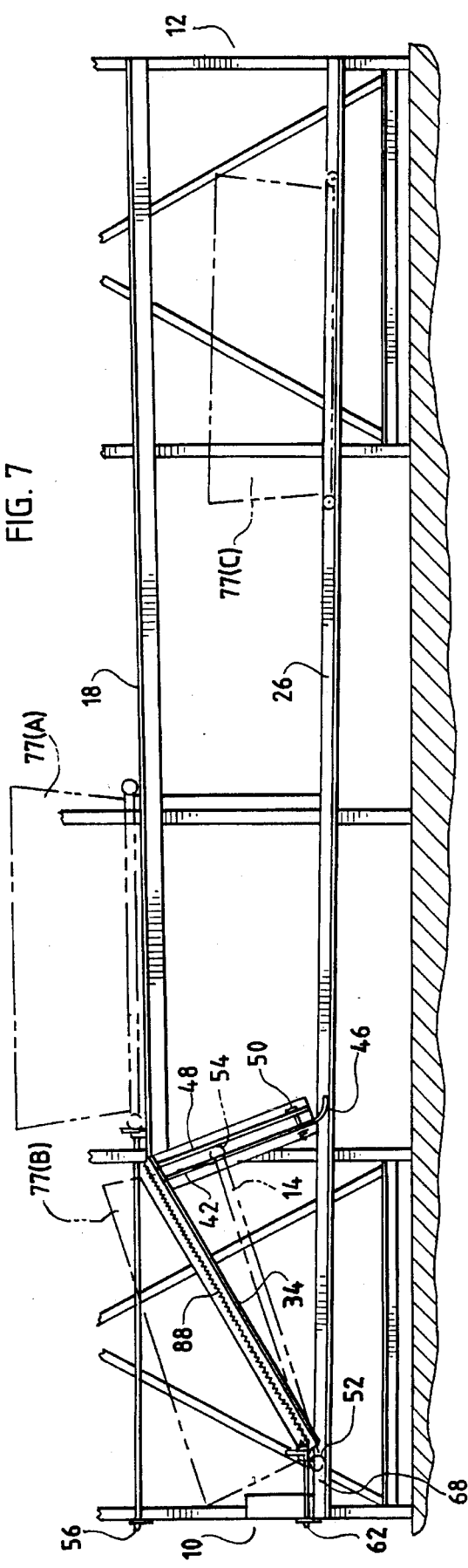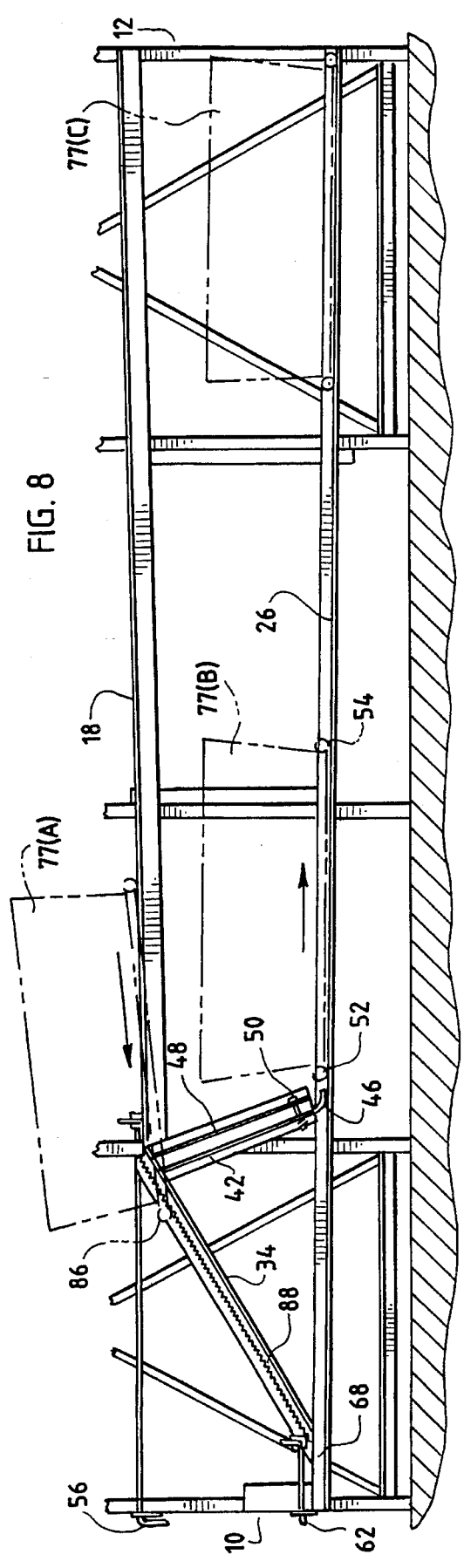

UNLOADING DEVICE

BACKGROUND OF THE INVENTION

The present invention relates generally to unloading systems, and more particularly, to container unloading systems that selectively and automatically cycle carts carrying unit loads, such as containers or parts bins, to the front of the system where the load is held at an angle for unloading and then cycles the carts and unloaded unit containers to the rear of the system for loading. Holding the container and load at an angle increases the ease in which objects can be removed from the container which can lead to increases in productivity.

While this invention has applications in a wide range of industries, it is particularly useful to assembly line manufacturing. In this type of operation, an important consideration is supplying the line worker with a constant stream of parts. Another important consideration is ease of access to the parts. Any delay in the parts stream or difficulties in obtaining parts can lead to inefficiencies of the entire assembly line.

While return systems, such as described in U.S. Pat. No. 5,170,896 entitled "Pallet Return Pallet Rack System," can cycle carts carrying unit loads, these systems would not make suitable container unloading systems. First, these return systems do not increase access to the container since they use gradually inclined rails and do not include sections of increased angularity. Second, without sections of increased angularity, the height of the container and cart used is limited by the vertical distance between the systems' upper and lower rails. Since this vertical distance is typically less than the height of a suitable parts bin or container, return systems, again, would not be practical as container unloading devices.

Consequently, one of the advantages of a pallet return system is that it can supply a steady stream of parts to the front of the system for use by the worker. However, in some applications, it may be necessary to provide a way to improve the access to the parts by the worker and to provide a system that could be used with suitable parts bins or containers.

SUMMARY OF THE INVENTION

The present invention preserves the advantages of the pallet return system and also provides new features and advantages not found in the prior art. Specifically, the current invention provides a system that can support most types of containers at a selected angle during unloading in order to improve the access to the parts inside of the containers. Once the container is emptied, it is then efficiently cycled to the rear of the system for reloading and another loaded container and cart moves forward to take is place. Thus, a steady stream of parts is provided.

In a preferred embodiment of the present invention, a container unloading system is provided which includes a two-tiered rail system that has been adapted to include an upper set of feed rails and a lower set of return rails that cycle carts carrying loads from the back of the system to the front of the system for unloading. At the system's front end, the feed rails have sections of increased angularity which support the load at an angle which increases the accessibility to the container's contents. The sections of increased angularity also increase the vertical distance between the upper and lower rails which allows the system to be used with a wide variety of parts bins and containers.

Once the container is unloaded, cart stops which hold the cart and container on the angled rails are released and the cart and container engage a set of transfer ramps which allow the cart to move from rolling engagement with the feed rails to rolling engagement with the lower set of return rails where the cart and container then move to the back of the system into a position for reloading.

Because the system is also designed to be used with loads which may weigh several thousand pounds, another embodiment of the invention includes a cart equipped with a speed reducer to retard the cart's acceleration down the inclined surface. The speed reducer is preferably a brake roller of the type described in U.S. Pat. No. 3,918,561, but a mechanical escapement, hydraulic shock absorber or other types of speed governing devices which would be readily understood by those of ordinary skill in the art may also be used.

In another embodiment of the invention, the system uses a speed reducer that is not attached to the cart. In this embodiment, a similar two-tiered ramp structure is used to cycle carts and containers. In this embodiment, as the cart begins its descent down the sections of increased angularity, it engages a speed reducer that controls the cart's rate of descent.

Accordingly, an object of the present invention is to provide a container unloading system which improves the efficiency of an assembly line by providing a steady stream of parts to the line worker.

Another object of the present invention is to provide a container unloading system where the cart and container are held at an angle greater than the feed rails during unloading so as to improve the line worker's access to the container's contents.

Another object of the present invention is to provide a container unloading system having a sufficient vertical distance between the upper and lower rails which allows the system to be used with a vide variety of parts bins and containers.

An additional object of the present invention is to provide a container unloading system that uses a speed reducer to control a loaded container's and cart's descent down the sections of increased angularity.

Still a further object of the present invention is to provide a container unloading system that does not interfere with the rolling relationship and/or lateral alignment of the containers and carts on the upper feed or lower return pair of rails.

Another object of the present invention is to provide a cart return system that transfers unloaded carts from an unloading end and returns them to a reloading end where they may be conveniently stored, repositioned or re-used.

An additional object of the present invention is to provide a cart return system that can store loads of multiple depths in a first in, first out inventory basis and transfers unloaded carts for subsequent reloading from a different access aisle.

Yet an additional object of the present invention is to provide a container unloading system that can be used in combination with multiple rack systems, and that can be used in conjunction with other types of storage systems.

BRIEF DESCRIPTION OF THE DRAWINGS

These and other features, objects and advantages of the present invention will become apparent from the following description and drawings wherein like reference numerals represent like elements in the several views, and in which:

FIG. 1 is a perspective view of the present invention with portions removed to reveal aspects of the invention;

FIG. 2 is an exploded perspective view of a cart stop of the present invention;

FIG. 3 is a plan view of an embodiment of a cart of the present invention;

FIG. 4 is an exploded view of a front wheel and attached spur-gear;

FIG. 7 is a side view of the left-hand side of the invention showing an unloaded container and cart during transfer to the return rails by the transfer ramps, a loaded container and cart held in place on the feed rails by a first cart stop, and an unloaded container and cart traveling along the return rails to the rear of the system and into a loading position; and FIG. 8 is a side view of the left-hand side of the invention showing a loaded container and cart beginning the descent down the sections of increased angularity and the spur-gears engaging the racks, an unloaded container and cart traveling along the return rails to the rear of the system and into a loading position, and a cart and unloaded container in a loading position.

DETAILED DESCRIPTION OF THE PREFERRED EMBODIMENTS

Figure 5:
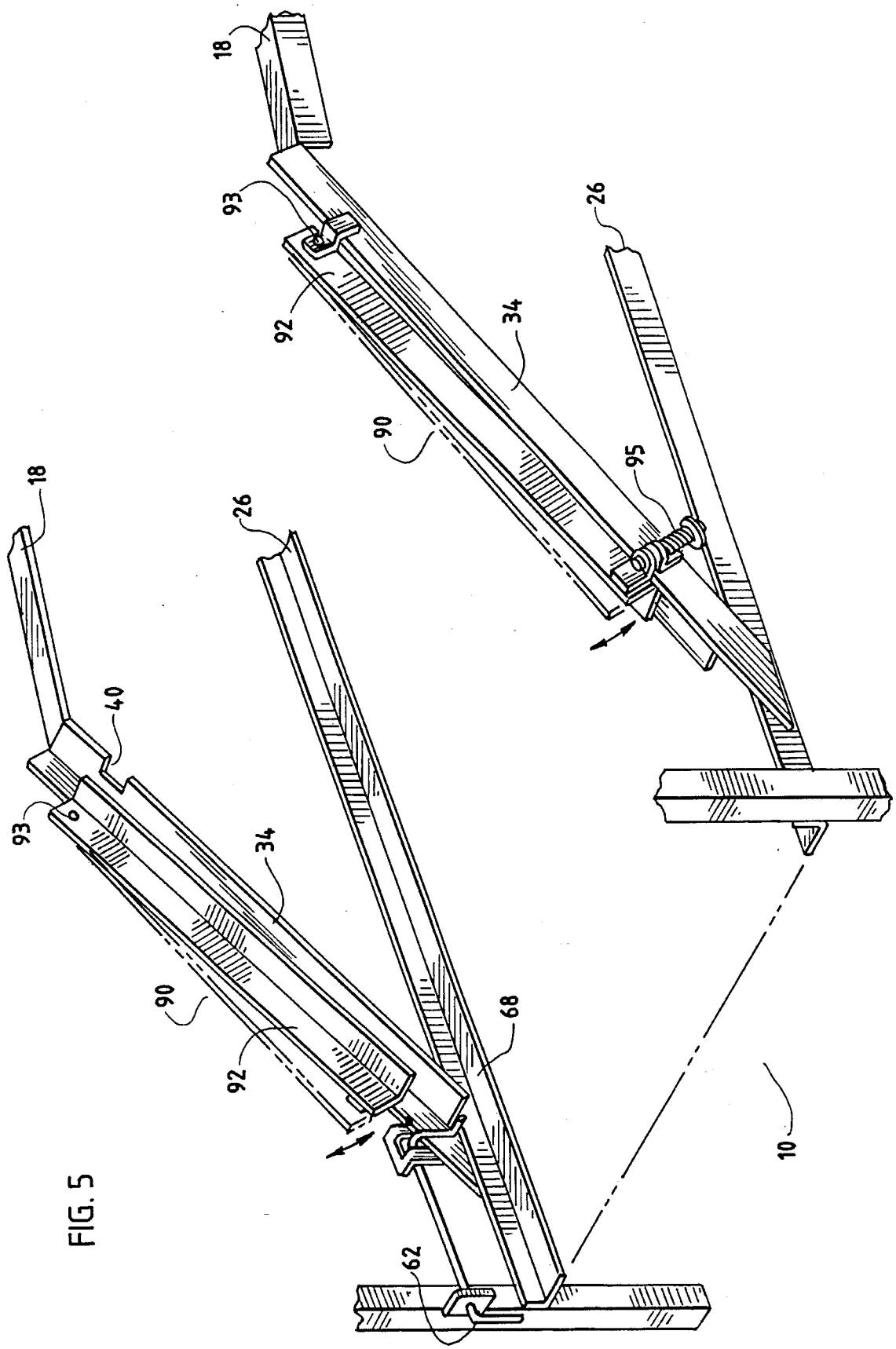
FIG. 5 is an exploded perspective view showing a speed reducer, which is located on the system's rails, that includes dampers and a biasing mechanism which act together to control the descent of the cart and container.

In accordance with a preferred embodiment of the present invention, the container unloading system, such as that shown in FIG. 1, consists of at least one cart 14 and at least one two-tiered rail system 16, which includes a pair of spaced, parallel feed rails 18 which have rolling surfaces 20, webs 22, and guide edges 24. Two-tiered rail system 16 also has at least one pair of spaced, parallel return rails 26, which further include rolling surfaces 28, webs 30, and guide edges 32. As used herein, and as shown on FIG. 1, front end 10 refers to an unloading end which is generally associated with an aisle for line workers (not shown). The rear end 12, as used herein, refers to a loading or reloading end which is also generally associated with an aisle for workers and equipment used in loading or reloading (not shown). Feed rails 18 are positioned above return rails 26 and are sloped downwardly from the rear end 12 to front end 10 at a gradual angle. Feed rails 18 further include sections of increased angularity 34 near front end 10. Return rails 26 are sloped downwardly from front end 10 to rear end 12 at a gradual angle.

Rails 18 and 26 are secured in place by upright columns 36 and parallel beams 38. Extra support can be provided as necessary by using a greater number of upright columns, cross and parallel beams as will be understood by those of skill in the art. Further strength and rigidity is provided by fastening webs 22 and 30 to upright columns 36.

FIG. 1 shows a left-hand portion (when viewed from the unloading or front end) of the system and it will be understood by those of ordinary skill in the art that the right-hand portion of is a mirror image of the left-hand portion. In addition, although angle members, channels and I-beams are shown for the elements in the preferred embodiments, it will be understood that other structural members having different cross-sectional shapes may be employed to practice the inventions.

Feed rails 18 further include notches or first passageways 40, which are connected to transfer ramps 42 containing ramp hinges 44 and curved portions 46. Oppositely located across from transfer ramps 42 are hinged dampeners 48. Hinged dampeners 48 are biased toward transfer ramps 42 by spring bolts 50. Although the use of transfer ramps and dampeners is not required, their use is desirable to facilitate the smooth transfer of cart 14 and to prevent any needless damage to the cart and wheels.

Notches 40 are depth-proportioned to permit a pair of front wheels 52 of cart 14 to roll forward on rolling surfaces 20 of feed rails 18, past and unobstructed by notches 40. The distance between the front most portion of sections 34 and notches 40 should be equal to or slightly less than the distance between front wheels 52 and rear wheels 54 of cart 14. In this manner, cart 14 is transferred from feed rails 18 to return rails 26 by moving from rolling engagement with feed rails 18 to rolling engagement with return rails 26.

As shown in FIGS. 1 and 2, the system further includes a first set of cart stops 56 having rotatable rods 58 and rod brackets 60 which are attached to webs 22 of feed rails 18. Stops 56 are positioned to prevent front wheels 52 from proceeding past notches 40 and onto sections of increased angularity 34 when in the engaged position. Second set of cart stops 62, which may be of the same construction as stops 56, include rods 64, brackets 66 and are attached at webs 30 of return rails 26. Second set of cart stops 62 engage front wheels 52 and prevent the transfer of cart 14 from feed rails 18 to return rails 26 when in the engaged position.

Feed rails 18 terminate at a point above rolling surfaces 28 of return rails 26 so as to form apertures or second passageways 68. The height of apertures 68 should be slightly larger that the diameter of front wheels 52 so as to allow for the passage of front wheels 52 through apertures 68 and under sections 34 thereby permitting the return of the carts.

The details of cart 14 may better be seen with reference to FIG. 3. The frame of cart 14 consists of side angle members 70, front member 72, rear member 74 and any additional number of cross members 76 that may be necessary to support a given load. Side members 70 are secured to members 72, 74 and 76, which together form the load bearing surface of cart 14 and can be adapted to carry unit load container 77 as shown in FIG. 1.

As indicated, cart 14 includes a pair of front wheels 52 and a pair of rear wheels 54. Wheels 52 and 54 are rotatably mounted to cart 14 and front wheels 52 extend laterally outside the width of cart 14 a distance greater than rear wheels 54 an amount sufficient for front wheels 52 to roll forward on rolling surfaces 20 of feed rails 18 without interference from or passing through notches 40.

Rear wheels 54 are rotatably mounted to side channels 70 and are spaced such that when rear wheels 54 are in rolling engagement with upper rolling surfaces 20, they will intersect notches 40, when desired. Cart 14 may be further provided with a pair of front guide wheels 78 and a pair of rear guide wheels 80 (see FIG. 3). Front guide wheels 78 and rear guide wheels 80 are positioned to cooperate with guide edges 24 and 32, thereby keeping cart 14 in proper lateral alignment and providing smooth operation as cart 14 rolls along rails 18 and 26.

It will be apparent to those of ordinary skill in the art that there are other methods to guide the cart during operation as well. For example, fixed guides (not shown) may be used which may be affixed along the sides of cart 14 or elsewhere, in a location to provide the desired guiding function. Nylon, teflon or similar pads or strips may be employed, if desired. Accordingly, the various guide elements described herein, as well as equivalent means, may be used alone or in combination to achieve the desired and automatic guide function during transfer and for proper lateral alignment as cart 14 rides on rails 18 and 26. Although the present invention may be practiced without the use of guides, guides are generally preferred.

As further shown in FIGS. 3 and 4, a preferred embodiment of cart 14 may further include a speed reducer 82 which controls the rate of descent of cart 14 down sections of increased angularity 34. A speed reducer is necessary in applications in which the weight of the loaded container and cart is of sufficient magnitude that allowing the cart to roll freely down sections 34 would present a dangerous situation if the cart's acceleration was not controlled in some manner.

Speed reducer 82 is preferably a brake roller of the type described in U.S. Pat. No. 3,918,561, but a mechanical escapement, hydraulic governor, hysteresis wheel or any other speed governing devices which would be readily understood by those of ordinary skill in the art could also be used. Speed reducer 82 may be connected to front wheels 52 by axle 84 and should only be activated when cart 14 begins its descent down sections of increased angularity 34 so as not to impede the efficient movement of cart 14 along the gradual inclines rolling surfaces 20 and 28.

Figure 6:
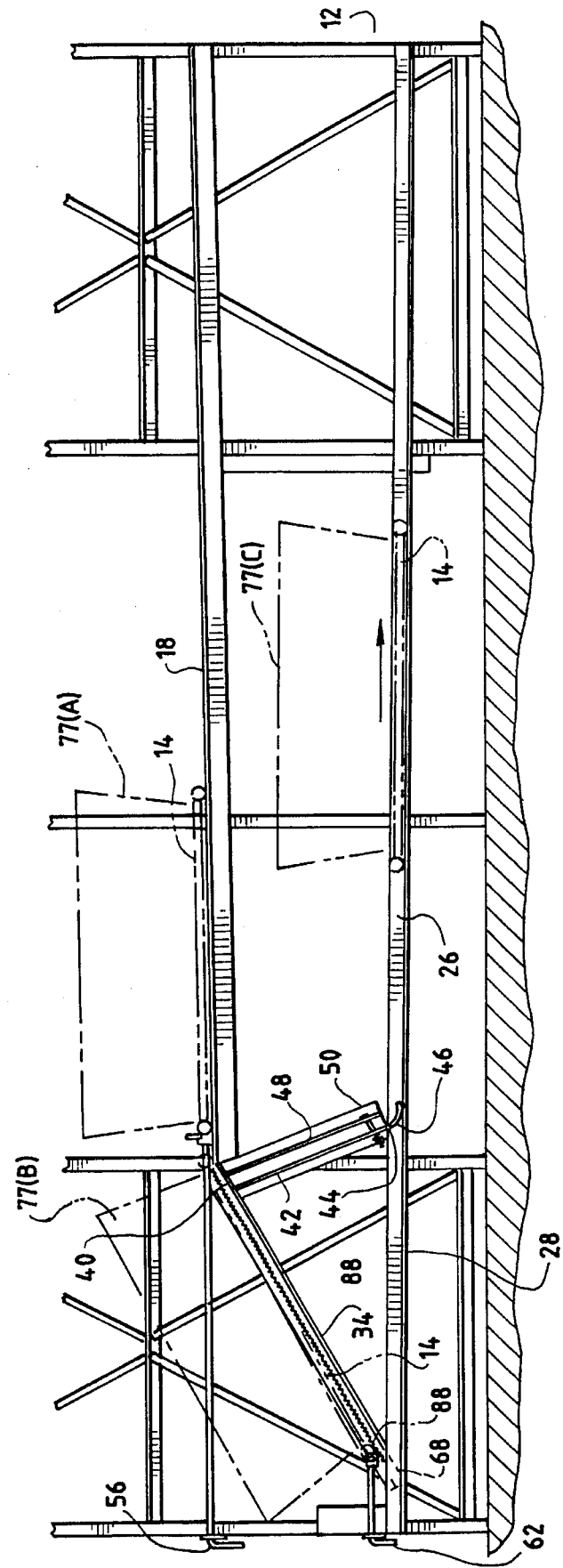
FIG. 6 is a side view of the left-hand side of the invention showing a container and cart being supported at an angle so as to improve the accessibility to the container's contents, a loaded container and cart held in place on the feed rails by a first cart stop, and an unloaded container and cart traveling along the return rails to the rear of the system and into a loading position.

In some applications, the weight of the load may be of such a magnitude that the speed reducer may be overridden if the load is heavy enough to cause front wheels 52 to slide uncontrollably down the rails. To prevent sliding, cart 14 may further include spur-gears 86 which are connected to axle 84 and which mesh with racks 88 located along the sides of sections 34 as shown in FIGS. 6–8. The diameter of spur-gears 86 should be less than that of front wheels 52 so as not to interfere with the cart's movement on rolling surfaces 20 and 28. Moreover, spur-gears 86 may be connected to axle 84 and front wheels 52 may be independently connected to cart 14 thereby limiting the activation of the speed reducer to instances in which cart 14 is on sections 34. Racks 88 should also be positioned slightly above rolling surfaces 20 in order to compensate for the decreased diameter of gears 86 and to allow for full engage without interference from front wheels 52.

It should be understood that sliding could also be prevented by the use of sprockets and chains, the use of abrasive, non-skid surfaces and wheels of suitable material for increasing traction such as rubber, and through the use other methods which persons of ordinary skill in the art would appreciate. Moreover, the invention is not limited to the use of a single speed reducer which has been attached to the front wheels by an axle. Other design choices may include the use of multiple speed reducers or the use of a speed reducer which may be attached to the front and/or rear wheels as well as being an independent axle altogether.

In another embodiment the descent of cart 14 is controlled by the use of a speed reducer 90 which is not connected to cart 14. As shown in FIG. 5, an embodiment of this design includes hinged dampers 92 which are connected to rail system 16 by hinges 93. Dampers 92 are also connected to spring bolts 95 which resist any upward movement of dampers 92 and bias dampers 92 toward feed rails 18. It should also be understood that other compressible mechanisms such as adjustable hydraulic shock absorbers or any other compressible mechanical device which would be readily apparent to those of ordinary skill in the art could also be used in the place of the disclosed spring bolts 95 to either indirectly or directly engage cart 14. Moreover, those of ordinary skill in the art would recognize that the cart's descent may also be controlled by directly engaging a compressible mechanism such as a spring or hydraulic piston. Use of a system of this design also eliminates the possibility of uncontrolled sliding.

The operation of the invention may be better understood by reference to FIGS. 6–8. In a preferred embodiment using spur-gears 86 and racks 88, at least one cart 14 is needed to cycle through the system, although the invention could easily accommodate a greater number of carts. As shown in FIG. 6, a loaded container 77(A) and cart 14 is at rest on feed rails 18. First set of cart stops 56 permit the selective transfer of carts and prevent any forward movement of cart 14 and container 77(A) along the downward slope of feed rails 18 and from rolling down sections of increased angularity 34. At the same time, a cart and container 77(B) that is being unloaded may be sitting at an increased angle upon increased angular sections 34 and any forward movement will be prevented by second set of cart stops 62. An additional cart 14 and container 77(C) is returning to a loading position at rear end 12.

Once the container is emptied, an operator disengages cart stops 62. Upon disengagement, spur-gears 86 will move forward along racks 88 until cart 14 and container 77(B) fall off of feed rails 18 and onto rolling surfaces 28 of return rails 26 as shown in FIG. 7. At the same time, rear wheels 54 will also move forward until intersecting notches 40 and engaging transfer ramps 42 and dampeners 48.

Dampeners 48 are biased towards transfer ramps 42 by spring bolts 50 or hydraulic shock absorbers (not shown) and slow the rate of descent of rear wheels 54 down transfer ramps 42 to prevent any needless damage. Upon reaching curved portions 46, the downward inclines of rolling surfaces 28 and curves 46 propel cart 14 rearward along return rails 26 until cart 14 and container 77(B) come to rest in a position for reloading. As cart 14 is moving rearward, front wheels 52 will pass beneath front sections 34 by traveling through apertures 68 and will not be obstructed by curved portion 46 since hinges 44 allow this segment to swing up upon passage of the cart. As shown in FIG. 8, once unloaded container 77(B) and cart 14 clear increased angular sections 34, first set of cart stops 56 may be disengaged as desired. This causes another loaded container 77(A) and cart 14 to move forward on rolling surfaces 20 until cart 14 and container 77(A) reach increased angular sections 34. Upon reaching sections 34, spur-gears 86 will engage racks 88 and speed reducer 82 will cause cart 14 and container 77(A) to ride safely on racks 88 until transfer to return rails 26 where, once again, cart 14 and container 77(A) will ride on front wheels 52. In this fashion, a fresh load of parts will be delivered for unloading and the cycle will continue.

In an embodiment in which compressible speed reducer 90 is used, the overall operation of the invention is not changed. However, as cart 14 begins its descent down sections 34, front wheels 52 of cart 14 engage dampers 92. As the wheels 52 push dampers 92 upwardly, spring bolts 95 will be compressed and resist the upward movement of dampers 92. Through the cart's engagement with dampers 92, the resistance generated from spring bolts 95 indirectly provides the necessary control of cart 14. To provide a system that can be adjusted to control carts of different weight, an adjustable compressible mechanism may be used. In this type of system, as the weight of the carts is increased, the amount of tension provided can be increased as well.

In an embodiment of this design there may be no need to use spur-gears 86 and racks 88 since compressible speed reducer 90 maintains control of cart 14 for its entire descent down sections 34 until transfer to rails 26. Speed reducer 90 should also be designed so as not to interfere with the transfer of cart 14 from feed rails 18 to return rails 26.

While the preferred embodiments of the present invention have been illustrated and described, it will be understood by those of ordinary skill in the art that changes and other modifications can be made without departing from the invention in its broader aspects.

Accordingly, persons of ordinary skill in the art would also understand that the invention would not be limited to the containers used and that cart 14 could be adapted for use with slip-sheets, containers, barrels, parts bins and other types of unit loads used in manufacturing or warehouse systems. Various features of the present invention are set forth in the following claims.

What is claimed is:

1. A container unloading system having an unloading front end and loading rear end comprising:

a two-tiered rail system having a set of parallel feed rails and a set of parallel return rails positioned below said feed rails;

said feed rails having sections of increased angularity near said front end;

at least one cart having a load bearing surface adapted to carry a unit load and further including support means for the attachment of front and rear wheels; said wheels positioned on said cart for rolling engagement with said feed rails and said return rails of said two-tiered rail system;

a first set of passageways located above said return rails, said first passageways adapted to permit said rear wheels of said cart to move from rolling engagement with said feed rails to rolling engagement with said return rails;

a second set of passageways located above said return rails, said second passageways adapted to permit said front wheels of said cart to move from rolling engagement with said feed rails to rolling engagement with said return rails;

said cart selectively retained on said feed rails during the unloading of said cart;

said rail system adapted for said cart to be supported on said sections of increased angularity during the unloading of said unit load; and a speed reduction means for controlling said cart's descent down said sections of increased angularity.

2. The device of claim 1 further including a set of transfer ramps adjacently located near said first passageways which engage said rear wheels and facilitate the transfer of said cart from rolling engagement with said feed rails to rolling engagement with said return rails.

3. The device of claim 2 further including dampeners opposingly located from said transfer ramps for controlling the descent of said cart down said transfer ramps.

4. The device of claim 1 wherein said speed reduction means is attached to said cart and is selected from the group consisting of a brake roller, hysteresis wheel, mechanical escapement, or hydraulic governor.

5. The device of claim 4 wherein said cart further includes an axle connected to said speed reducer and said axle having at its ends spur-gears for engaging racks located alongside said sections of increased angularity.

6. The device of claim 4 wherein said cart further includes an axle connected to said speed reducer and said axle having at its ends sprockets for engaging chains located alongside said sections of increased angularity.

7. The device of claim 1 wherein said speed reduction means is a compressible mechanism which is attached to said rail system and engages said cart.

\* \* \* \* \*

UNITED STATES PATENT AND TRADEMARK OFFICE
CERTIFICATE OF CORRECTION

PATENT NO.   : 5,567,103

DATED        : October 22, 1996

INVENTOR(S): Anthony N. Konstant

It is certified that error appears in the above-identified patent and that said Letters Patent are hereby corrected as shown below:

On the Title Page, item 73, Assignee, insert -- Konstant Products, Inc., Skokie, Illinois --

Signed and Sealed this

Fifth Day of August, 1997

Attest:

BRUCE LEHMAN

Attesting Officer

Commissioner of Patents and Trademarks